Jan. 28, 1936.   R. M. MILLER   2,029,079
CYCLE CHAIN LUBRICATION DEVICE
Filed Dec. 6, 1934

R. M. Miller
INVENTOR

By Glascock Downing & Seebold
Attys.

Patented Jan. 28, 1936

2,029,079

UNITED STATES PATENT OFFICE 2,029,079

CYCLE CHAIN LUBRICATION DEVICE

Raphael Moray Miller, Paddington, near Sydney, New South Wales, Australia

Application December 6, 1934, Serial No. 756,317
In Australia October 26, 1934

2 Claims. (Cl. 184—15)

This invention relates to the lubrication of cycle chains, and has application to both motor cycles and pedal cycles having tubular frame members.

Means for lubricating the chain of a motor cycle by crank-case oil have been proposed, but since the supply is not controlled, over-lubrication results. Moreover these means are not applicable to pedal cycles.

The object of this invention is to provide means for the lubrication of chains which are equally applicable to motor or pedal cycles, which permit the supply of a regulatable controlled quantity of oil to the chain, and which do not involve any bulky additions to the cycle.

Figure 1:
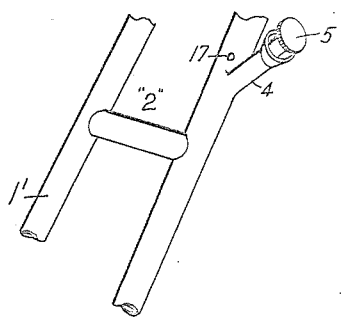
Figure 1:
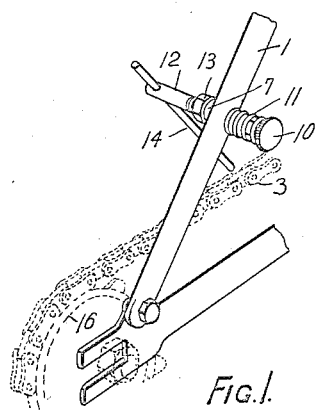
Figure 2:
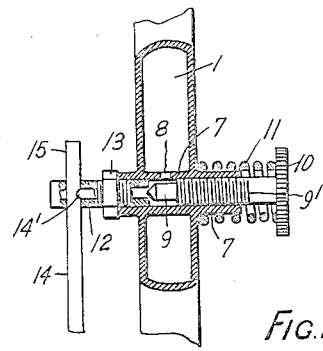
Figure 3:
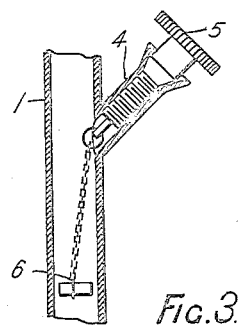

In order to fully described the invention reference is made to the accompanying drawing, in which Figure 1 is a fragmentary perspective view of the device as applied to a pedal cycle, Figure 2 is an elevation, partially in cross-section, of the metering means, and Figure 3 is a cross-sectional elevation of the filler means.

The hollow legs of the back-stay 2 of the cycle frame are shewn at 1 and $1^1$, and leg 1 on the side adjacent chain 3 is formed as an oil reservoir, for this purpose being fitted near its upper end with a flared filler tube 4 equipped with a screw plug 5. A security chain 6 located within tube 1 and secured to the inner end of plug 5 prevents loss of the latter.

Toward its lower end leg 1 is formed with a hollow transverse tube 7 therethrough, which extends beyond the leg on either side and which is in communication with the reservoir within the leg through an aperture 8 in the tube. A needle valve 9, having a threaded body $9^1$ and a finger-head 10, is screwed into the "outer" end of tube 7 (that end remote from chain 3) and is retained in adjusted position by a tension spring 11 secured over tube 7 and contacting with head 10.

A hollow nipple 12 is screwed into the "inner" end of tube 7 (that end adjacent chain 3) and is retained in adjusted position by a lock-nut 13. The needle valve 9 is adapted to seat upon the nipple 12 within tube 7, and to co-act therewith in regulating the oil flow in known manner.

A feed pipe 14 extends into the nipple 12, and has communication with the interior thereof through an aperture $14^1$. It will be seen that rotation of nipple 12 in tube 7 will effect a horizontal and vertical adjustment of feed pipe 14 in relation to chain 3, so that the feed pipe may be adjusted (within its limits) to overlie the chain in close proximity thereto for any cycle, and be locked in the adjusted position by nut 13.

The reservoir in leg 1 being filled with oil, and needle valve 9 moved off its seating on nipple 12, the oil will flow from the reservoir into tube 7, between needle valve 9 and its seating, through the nipple 12 and feed pipe 14 to deposit on the chain 3. The rate of flow may be finely adjusted by the needle valve means described.

An air vent 17 is provided above the filler tube 4 to permit free flow of the oil from reservoir 1. It is desirable that feed pipe 14 should deposit oil on the top bight of the chain in advance of the rear sprocket 16, so that the oil may have time to penetrate the links of the chain before being subjected to centrifugal action as the chain passes around a sprocket.

The feed pipe 14 is continued on the opposite side of nipple 12 as at 15 to form a hook over which the chain 3 may be engaged when removed from sprocket 16.

I claim:

1. A lubricating device for cycle chains including in combination a tubular cycle frame having a hollow portion forming a reservoir for oil, means for introducing oil into the reservoir, means for discharging oil from the reservoir including a hollow tube integral with the reservoir and traversing the same and provided with an opening for establishing communication with the reservoir, the respective ends of the tube projecting beyond the sides of the reservoir and being open, a hollow and threaded nipple rotatably mounted in one end of said tube, a feed pipe carried by and in communication with the nipple for conducting oil to a desired point upon the chain, means coacting with the nipple and tube for removably clamping the nipple in the desired position of adjustment, the inner end of the nipple constituting a valve seat, and a manually operable valve arranged in adjustable threaded engagement with the other end of the tube for coacting with the seat to regulate the flow of oil from the reservoir to the nipple.

2. A lubricating device for cycle chains including in combination, a tubular cycle frame having a hollow portion forming a reservoir for oil, means for introducing oil into the top of the reservoir, means for discharging oil from the reservoir, including a hollow tube traversing and in communication with the reservoir, a feed pipe operatively connected to one end of the tube and in communication therewith for conducting oil to a desired point upon the chain, means for removably clamping the feed pipe in the desired position of adjustment, and a valve mounted in the tube for regulating the flow of oil from the reservoir to the feed pipe.

RAPHAEL MORAY MILLER.